United States Patent

Tonooka

[11] Patent Number: 5,917,665
[45] Date of Patent: Jun. 29, 1999

[54] REFLECTING MIRROR FOR AUTOMOTIVE LAMP AND AUTOMOTIVE LAMP INCLUDING SAME

[75] Inventor: Sinya Tonooka, Shizuoka, Japan

[73] Assignee: Koito Manufacturing Co., Ltd., Tokyo, Japan

[21] Appl. No.: 08/550,609

[22] Filed: Oct. 31, 1995

[30] Foreign Application Priority Data

Nov. 1, 1994 [JP] Japan .................................. 6-290366

[51] Int. Cl.⁶ .......................... G02B 5/08; G02B 7/182; B60Q 1/06; F21V 21/00
[52] U.S. Cl. ......................... 359/838; 359/872; 362/516; 362/528; 362/341
[58] Field of Search ............................ 362/61, 296, 66, 362/269, 273, 275, 282, 284, 341, 516, 528; 359/838, 871, 872, 515, 516

[56] References Cited

U.S. PATENT DOCUMENTS

| 4,217,631 | 8/1980 | Bergkvist | 362/66 |
| 4,555,748 | 11/1985 | Bradley | 362/296 |
| 4,669,035 | 5/1987 | Hyde et al. | 362/66 |
| 4,675,793 | 6/1987 | Capellari et al. | 362/66 |
| 4,845,598 | 7/1989 | Watanabe et al. | 362/66 |
| 4,931,912 | 6/1990 | Kawakami et al. | 362/61 |
| 5,050,048 | 9/1991 | Hendrischk et al. | 362/269 |
| 5,107,407 | 4/1992 | Collot et al. | 362/61 |
| 5,117,335 | 5/1992 | Yamada | 362/61 |
| 5,143,445 | 9/1992 | Bateman et al. | 362/341 |

FOREIGN PATENT DOCUMENTS

5-34602  5/1993  Japan .......................................... 3/20

*Primary Examiner*—Ricky D. Shafer
*Attorney, Agent, or Firm*—Morgan, Lewis & Bockius LLP

[57] ABSTRACT

A reflecting mirror for an automotive lamp includes an opening edge, and a first portion. A thickness of at least a portion of the opening edge is greater than a thickness of the first portion.

22 Claims, 7 Drawing Sheets

REFLECTING MIRROR FOR AUTOMOTIVE LAMP AND AUTOMOTIVE LAMP INCLUDING SAME

BACKGROUND OF THE INVENTION

1. Field of the Invention

This invention relates to a reflecting mirror, and more particularly, to a reflecting mirror for an automotive lamp.

2. Division of the Related Art

An automotive lamp contains a reflecting mirror made of synthetic resin disposed on a lamp body with a mechanism for adjusting the position of the reflecting mirror with respect to the lamp body. For example, Unexamined Japanese Utility Model Publication No. Hei. 5-34602 discloses a lamp with a reflecting mirror supported by a member on a fixed side at three points in order to change the direction in which the reflecting mirror reflects light. The lamp also has two "aiming mechanisms" disposed at two of the three support points. Each aiming mechanism serves to adjust the position of the reflecting mirror in the vertical and horizontal directions.

To fabricate the reflecting mirror of the above described lamp, the mirror is molded so that the thickness of the reflecting mirror is substantially uniform. As a result, thermal deformations result from insufficient thickness and deformations are also caused by positional adjustment of the reflecting mirror.

Such deformations can be overcome by molding the reflecting mirror with a thickness having a safety factor included. However, if the thickness is increased over the entire portion of the reflecting mirror, the weight of the reflecting mirror also increases, which also causes problems.

SUMMARY OF THE INVENTION

Accordingly, the present invention is directed to a reflecting mirror for an automotive lamp that substantially obviates one or more of the problems due to limitations and disadvantages of the related art.

An object of the present invention is the provision of a reflecting mirror for an automotive lamp which reduces deformations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a reflecting mirror for an automotive lamp includes an opening edge, and a first portion, wherein a thickness of at least a portion of the opening edge is greater than a thickness of the first portion.

To further achieve these and other advantages and in accordance with the purpose of the invention, as embodied and broadly described, an automotive lamp includes a reflecting mirror having an opening edge, and a first portion, wherein a thickness of at least a portion of the opening edge is greater than a thickness of the first portion; a pivot section coupled to the reflecting mirror for adjusting a position of the reflecting mirror in at least one of a vertical and horizontal direction; and moving means for moving the reflecting mirror in an axial direction.

In another aspect, the automotive lamp includes a lamp body, a lens, and a reflecting mirror disposed between the lamp body and the lens, the reflecting mirror having an opening edge, and a first portion, wherein a thickness of at least a portion of the opening edge is greater than a thickness of the first portion.

The invention is applied to a reflecting mirror for automotive lamps in which an opening edge of the reflecting mirror has a thickness larger than a thickness of the other portion of the reflecting mirror. The reflecting mirror for automotive lamps of the present invention is characterized by a thickness of an opening edge of the reflecting mirror greater than a thickness of other portions of the reflecting mirror. Therefore, the present reflecting mirror is less subject to thermal deformations or deformations accompanied by positional adjustment. The weight of the reflecting mirror is increased only in proportion to the increase in the thickness of the opening edge.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2 is an enlarged sectional view of the lamp of FIG. 1 taken along line II—II;

DETAILED DESCRIPTION OF THE PREFERRED EMBODIMENTS

A reflecting mirror for automotive lamps and an automotive lamp using a reflecting mirror of the present invention will now be described in detail according to the preferred embodiments shown in the accompanying drawings.

As shown in FIG. 2, automotive lamp 1 includes a lamp body 2 made of synthetic resin. Lamp body 2 has a recess 3 opened toward the front of the lamp 1 (the front being in the light projecting direction). A lens 4, formed of a transparent material, such as glass and transparent synthetic resin, is attached to the lamp body 2 so as to cover the front opening of the lamp body 2. A reflecting mirror 5 is contained within a lamp space 6 defined by the lamp body 2 and the lens 4. The reflecting mirror 5 is pivotable with respect to the lamp body 2.

The reflecting mirror 5 is formed of synthetic resin and has a recess 7 opened onto the front surface. The inner surface of the recess 7 is formed into a reflecting surface. As shown in the enlarged circle of FIG. 2, the thickness d1 of an opening edge 5a of the reflecting mirror 5 is greater than the thickness d2 of another portion of the reflecting mirror 5 over the entire circumference of the opening edge 5a. As a result of this construction, the rigidity of the reflecting mirror 5 is improved with a reasonable increase in weight. Furthermore, the reflecting mirror 5 is less subject to thermal deformations (deformations caused by shrinkage after having been molded) and deformations resulting from adjustments in aim. The actual dimensions of opening edge 5a, such as d2, are appropriately determined in accordance with the size, shape, and other characteristics of the reflecting mirror 5 and are, preferably, within the following ranges: d2=2.0 to 3.0 mm; Δd=0.5 to 3.0 mm; d3=1.5 to 10.0 mm, wherein d3 is the length of the opening edge 5a (the length being the amount in the axial direction) and Δd=d1−d2.

Figure 5:
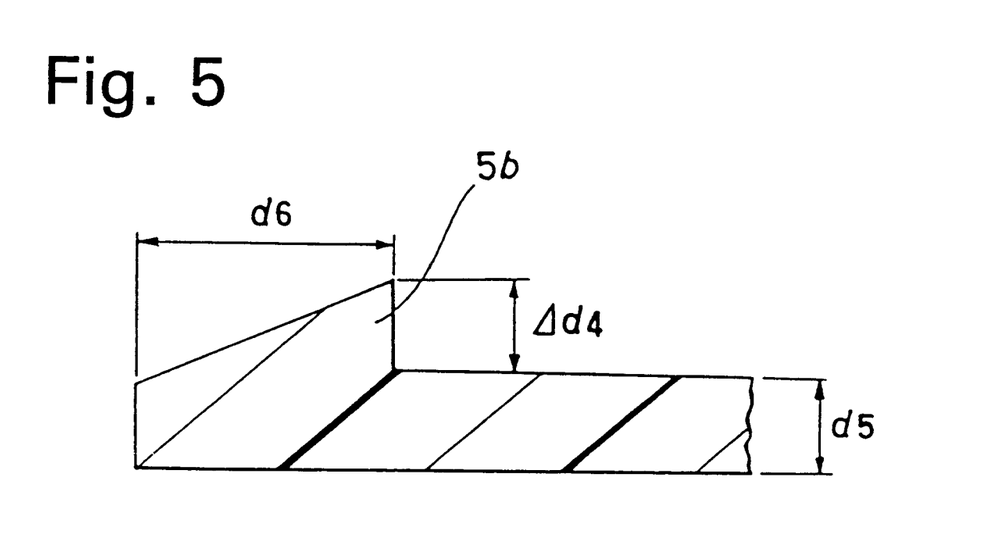
FIG. 5 is an enlarged sectional view showing a modified example of a thick-walled portion in an opening edge of a reflecting mirror.

Furthermore, the opening edge 5a may take any shape as long as the thickness or average thickness of the opening edge 5a is greater than the thickness of the remaining portion of mirror 5. For example, as shown by the opening edge 5b of FIG. 5, the cross-section extending along the length of opening edge 5a may take the form of an arrow. Reference character d5 of FIG. 5 indicates the thickness of the portion excluding the opening edge 5b, Δd4 indicates the height of a step between the opening edge 5b and the first portion, and d6 indicates the length of the opening edge 5b in the axial direction. These values can appropriately be determined according to the size, shape, and other characteristics of the reflecting mirror 5 within the following ranges: d5=2.0 to 3.0 mm; Δd4=0.5 to 3.0 mm; and d6=1.5 to 10.0 mm. In addition, only a portion of the opening edge can be formed as the thick-walled portion.

Figure 1:
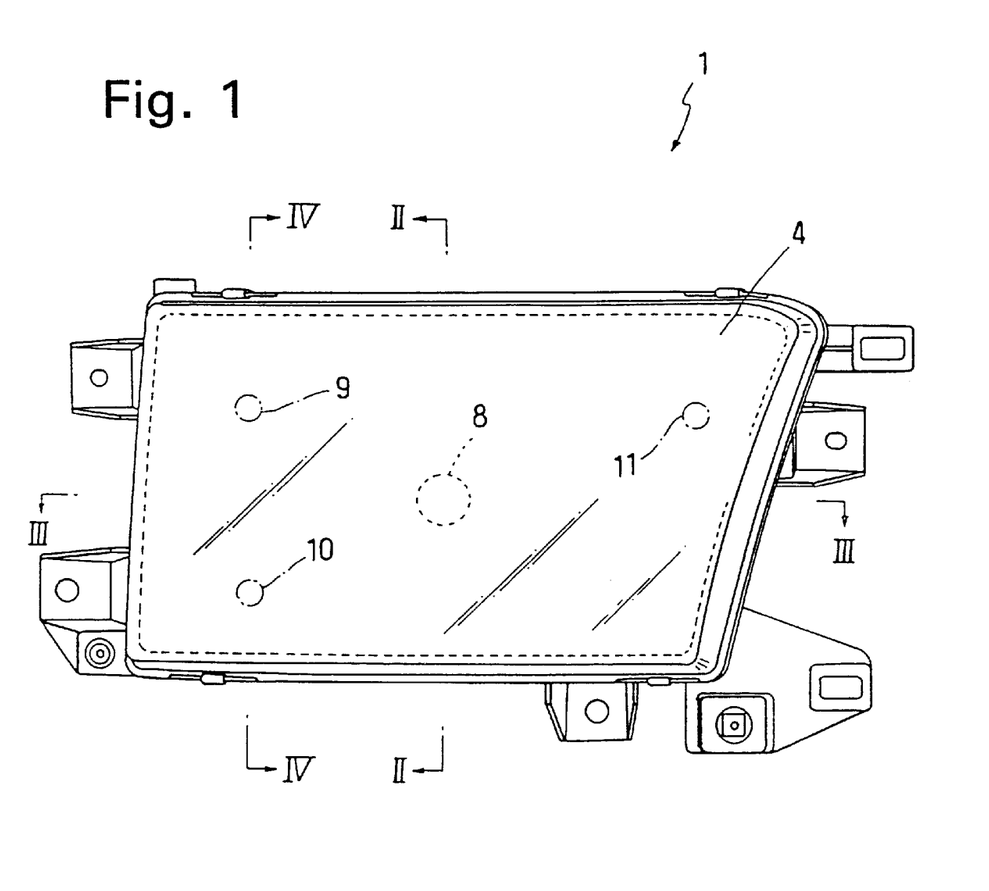
FIG. 1 is a front view of an automotive lamp in accordance with an embodiment of the present invention.
Figure 3:
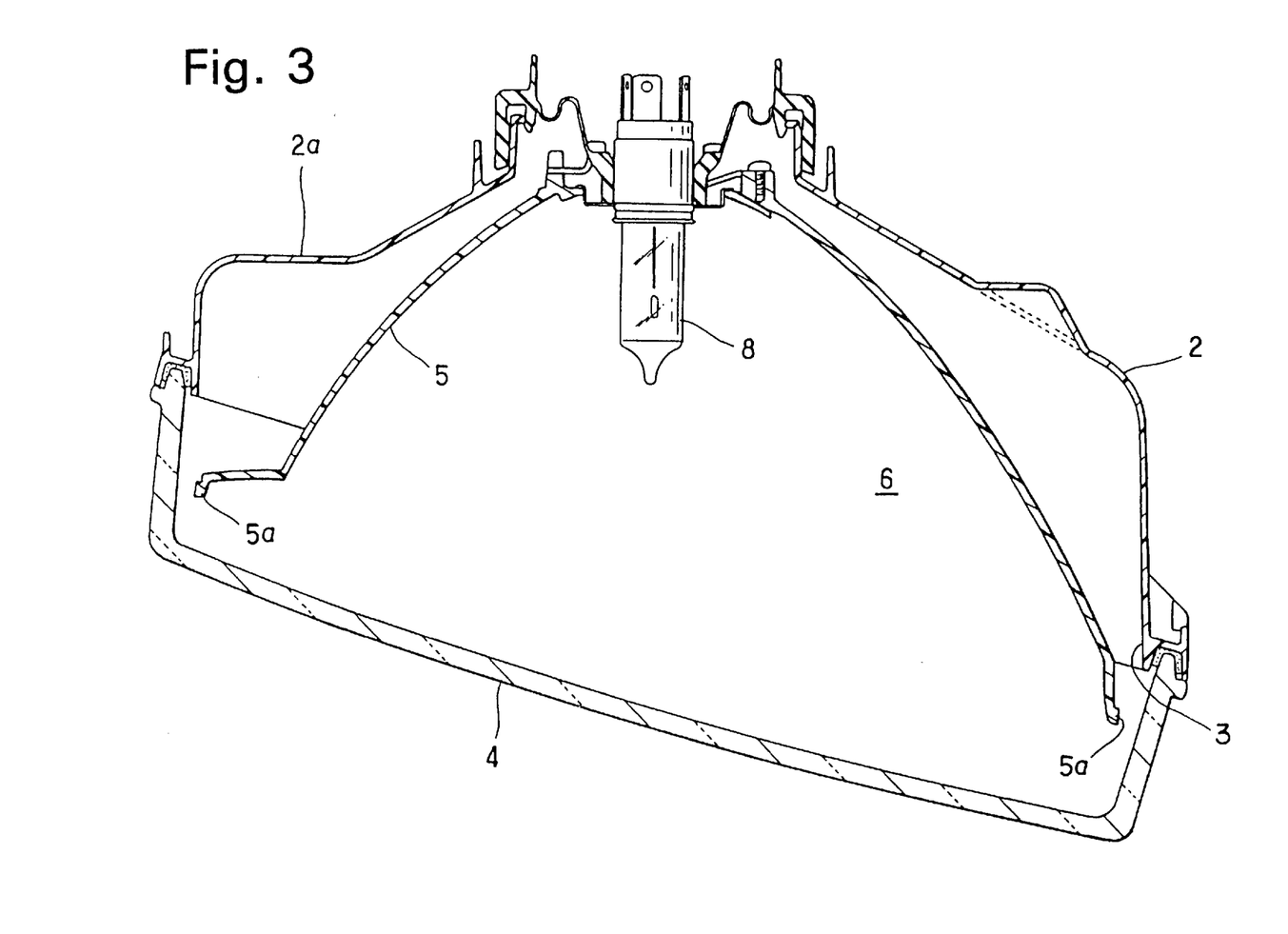
FIG. 3 is an enlarged sectional view of the lamp of FIG. 1 taken along line III—III.

As shown in FIG. 1, a bulb 8, is supported by the reflecting mirror 5. The reflecting mirror 5 is mounted onto the lamp body 2 at three points 9, 10, and 11 (each being indicated by a dotted line). Points 9, 10, and 11 are arranged as a horizontal 'L' as viewed from the front, the respective points forming the corner point and the end points of the 'L'. That is, point 9 and lower point 10 are located to the left of the center of the lamp 8, and point 11 is located to the right. Point 9 functions as an aiming pivot with a pivoting mechanism arranged. Aiming mechanisms are arranged at points 10 and 11, respectively.

Figure 4:
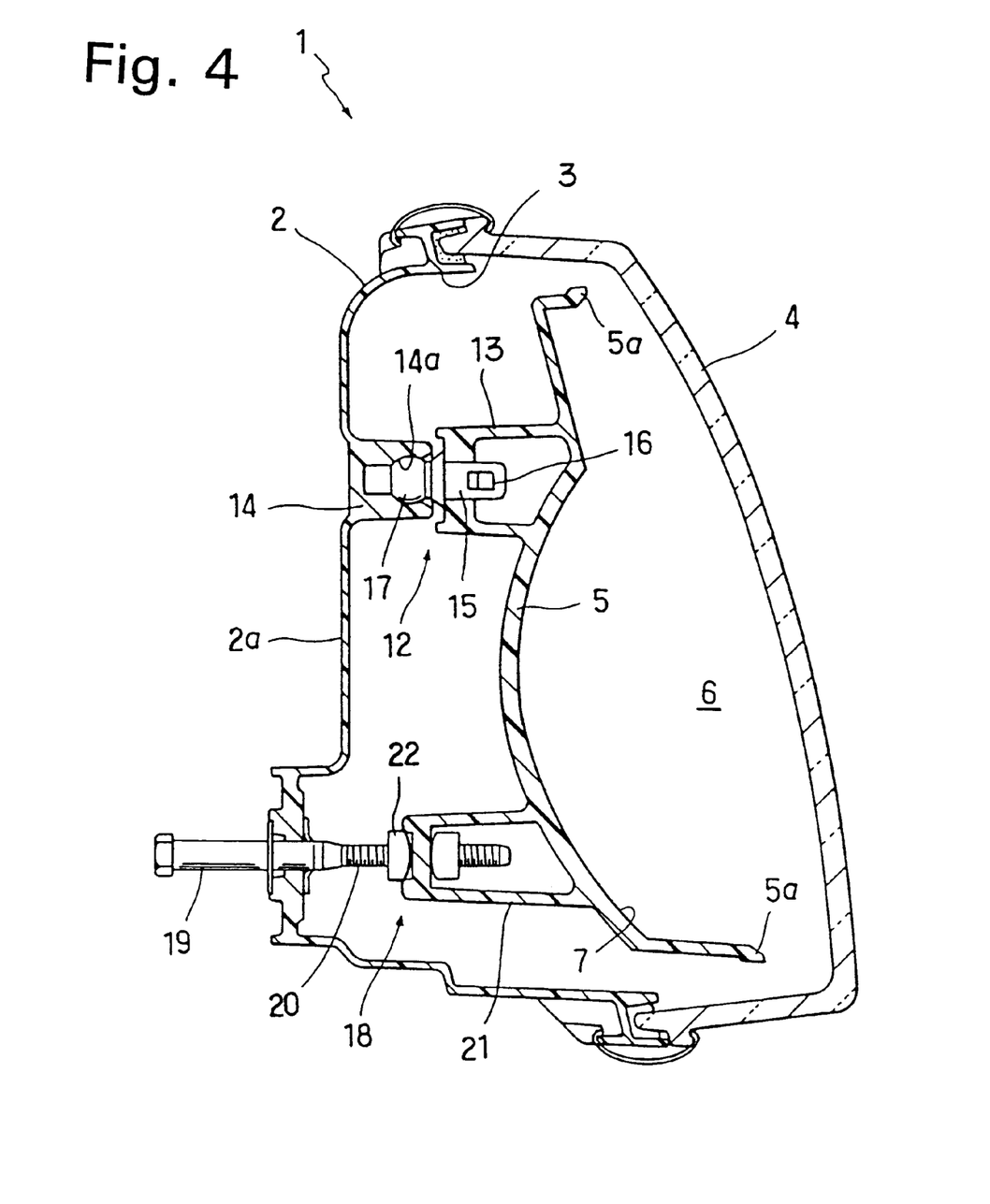
FIG. 4 is an enlarged sectional view of the lamp of FIG. 1 taken along line IV—IV.

As shown in FIG. 4, the pivoting mechanism 12 includes bosses 13 and 14, and a coupling member 15. The boss 13 projects from the back surface of the reflecting mirror 5 behind point 9. The boss 14 projects from the back wall 2a of the lamp body 2 to confront boss 13. The coupling member 15 couples bosses 13 and 14. The coupling member 15 has a portion 16 fixed to boss 13 that is closer to the front, and a spherical portion 17 that is rotatably accommodated on the back in a recess 14a of boss 14. As a result of this construction, the reflecting mirror 5 can pivot about the spherical portion 17.

As shown in FIG. 4, the aiming mechanism 18 and the pivoting mechanism 12 allow the reflecting mirror 5 to be pivoted within a vertical plane. An aiming screw 19 has a middle portion turnably supported by the back wall 2a of the lamp body 2 in an axially extending position. The front half of the aiming screw 19 has a threaded portion 20. A boss 21 projects from the back surface of the reflecting mirror 5 at a position corresponding to mounting point 10. Because the boss 21 is hollow, the boss 21 and the aiming screw 19 can be coupled by screwing the threaded portion 20 of the aiming screw 19 into a self-locking nut 22.

Therefore, when the aiming screw 19 is turned, threaded portion 20 of the aiming screw 19 is screwed into or unscrewed from the self-locking nut 22 in accordance with the turning direction. As a result, the distance between the back wall 2a of the lamp body 2 and the boss 21 can be adjusted by turning the aiming screw. Since the aiming screw 19 can be turned relative to the lamp body 2, but cannot move in the axial direction, it is the boss 21 that moves in the axial direction of the aiming screw 19 when the aiming screw 19 is turned.

Figure 6:
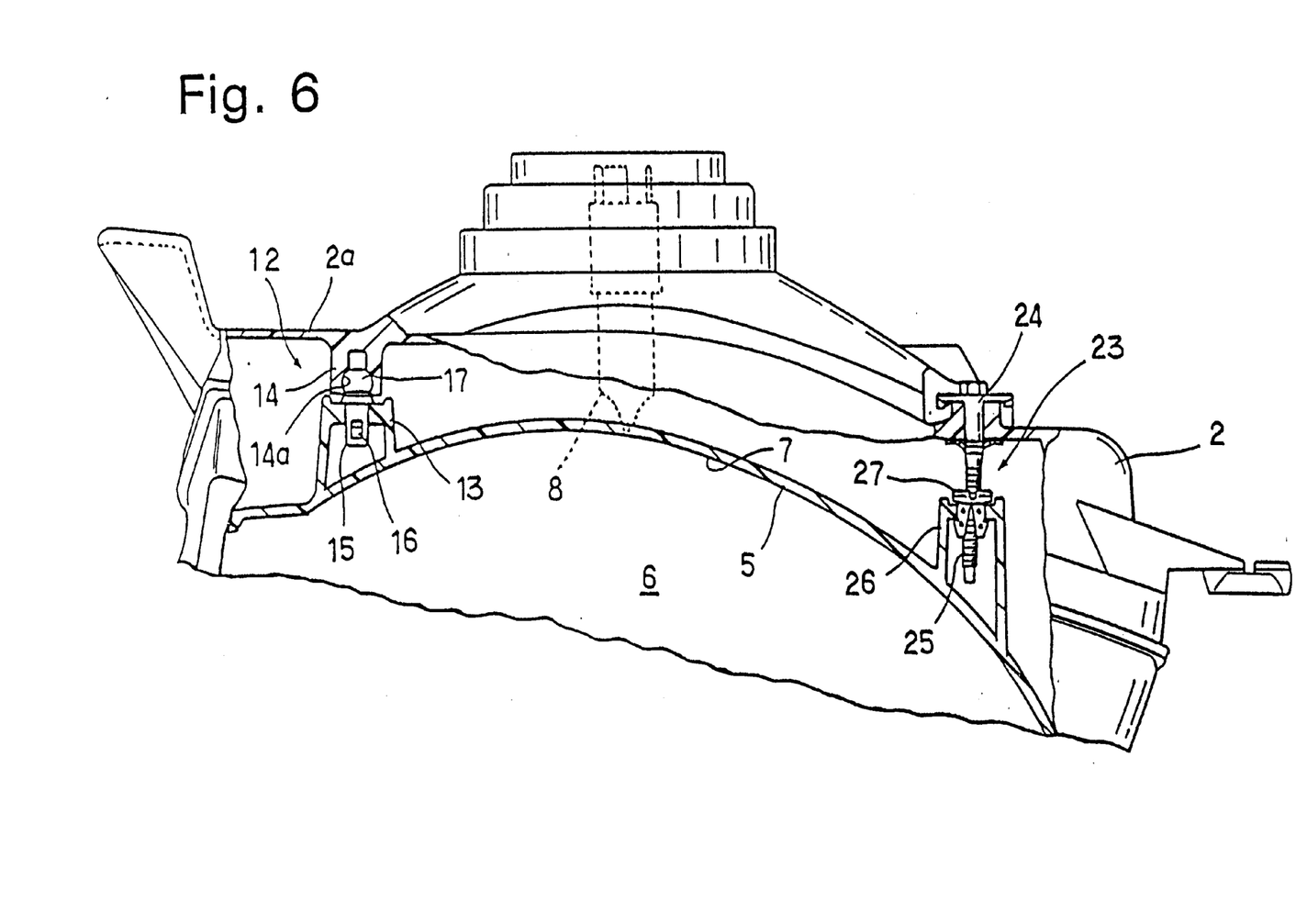
FIG. 6 is an enlarged, partial cutaway view of the main portion of a lamp illustrating an aiming mechanism in a horizontal direction.

As shown in FIG. 6, another aiming mechanism 23 corresponding to point 11 and the pivoting mechanism 12 allow the reflecting mirror 5 to be pivoted within a horizontal plane. An aiming screw 24 is turnably supported by the back wall 2a of the lamp body 2 at a position corresponding to the point 11 in an axially extending position. The front half of the aiming screw 24 has a threaded portion 25. A hollow boss 26 is integrally projected on the back surface of the reflecting mirror 5 at a position corresponding to the mounting point 11. A nut member 27 made of synthetic resin is attached to boss 26. The boss 26 is coupled to the aiming screw 24 by the threaded portion 25 of the aiming screw 24 screwed into the nut member 27.

Therefore, when the aiming screw 24 is turned, the threaded portion 25 of the aiming screw 24 screws into or unscrews from the nut member 27 depending on the direction it is turned. As a result, the distance between the back wall 2a of the lamp body 2 and the boss 26 can be adjusted depending on how far the aiming screw 24 has been turned. Since the aiming screw 24 can be turned relative to the lamp body 2, but cannot move in the axial direction, the boss 26 will move in the axial direction of the aiming screw 24 when the aiming screw 24 is turned.

As described above, the reflecting mirror 5 is pivotably supported so as to be pivotable with respect to the lamp body 2 by one pivoting mechanism 12 and two aiming mechanisms 8 and 23. The boss 26 of the reflecting mirror 5 receives a force exerted along the length of the aiming screw 24 through the nut member 27 at the time of making an aiming adjustment in both left and right directions. However, the reflecting mirror 5 can only move along the circumference of a circle with a radius equal to a segment connecting the spherical portion 17 and the nut member 27 with the spherical portion 17 as the pivot. Therefore, if the aiming screw 24 is moved in large amounts, the reflecting mirror 5 distorts.

The distortion of the reflecting mirror 5 becomes noticeable when an aiming adjustment mechanism of the reflecting mirror 5 in the horizontal direction, i.e, the pivoting mechanism 12 and the aiming mechanism 23, are arranged so as to be displaced from each other in the axial direction as shown in FIG. 6. More specifically, the center of the spherical portion 17 of the coupling member 15, which serves as the pivot of the reflecting mirror 5, and the acting point of the aiming mechanism 23 (i.e., the point at which the aiming screw 24 is coupled to the nut member 27) are displaced from each other in the axial direction at all times. This arrangement results from the shape of the reflecting mirror and the like losing symmetry with the main optical axis or that the parts and the like within the automobile do not allow the pivoting mechanism 12 and the aiming mechanism 23 to be juxtaposed in a horizontal direction because the shape of the lamp and the reflecting mirror are designed to suit the shape of the automobile.

Figure 7:
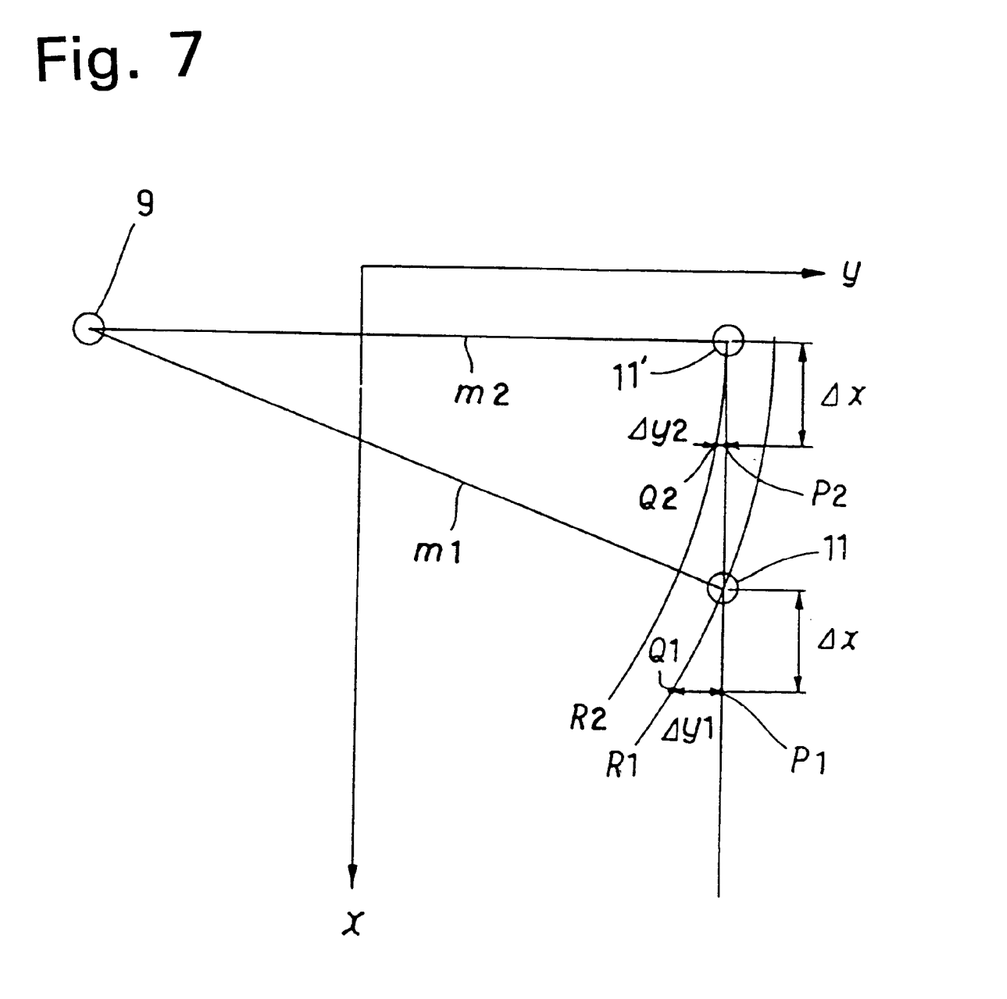
FIG. 7 is a schematic diagram illustrating the operation of the aiming mechanism in the horizontal direction.

Setting the axially extending x-axis and the horizontally extending y-axis as schematically shown in FIG. 7, the reflecting mirror 5 deforms greater when a straight line m1 connecting the point 9 and the point 11' is inclined with respect to the x-axis. This is because the amount of displacement in the y-axis direction is larger during the aiming adjustment when the line m1 is inclined with respect to the x-axis than when a straight line m2 connecting point 9 and point 11' substantially orthogonal to the x-axis.

More specifically, when point 11 is moved parallel (a distance "Δx") to a point P1 by the aiming mechanism, the reflecting mirror 5 is deformed corresponding to a displacement in the y-axis direction between a point Q1 and the point P1 (Δy1), the point Q1 being on an arc R1 subtending point 9 and passing through the point 11. This displacement Δy1 is larger than a displacement in the y-axis direction between a point P2 and a point Q2 (Δy2), the point P2 being obtained by moving the point 11' the same distance Δx parallel with the x-axis using the aiming mechanism and the point Q2 being on an arc R2 subtending the point 9 and passing through the point 11'.

If the degree of deformation of the reflecting mirror 5 at the time of making an aiming adjustment is likely to increase as described above, it is effective to make the thickness dl of the opening edge 5a of the reflecting mirror 5 larger than the thickness d2 of the other portion of the reflecting mirror 5 in order to prevent deformation of the reflecting mirror 5. While the foregoing description of aiming adjustments of the reflecting mirror 5 has been applied to the horizontal direction, the same principles apply to aiming adjustments in the vertical direction.

As is apparent from the foregoing description, one first aspect of the invention is characterized as making the thickness of the opening edge of the reflecting mirror larger than that of the other portion of the reflecting mirror. Therefore, the rigidity of the reflecting mirror, which prevents thermal deformation (deformation at the time of shrinkage after having been molded in particular) and deformation accompanied by position adjustment can be improved without a large increase in weight.

Furthermore, the degree of deformation of the reflecting mirror becomes relatively large in an automotive lamp having a pivot section and a pivoting means as proposed by the second and third aspects of the invention. The degree of deformation becomes particularly large in a lamp in which the pivot of the pivot section and the acting point of the pivoting means are always displaced from each other. The pivot section has a position adjusting mechanism for adjusting the position of the reflecting mirror in vertical and/or horizontal directions. The position adjusting mechanism is coupled to the reflecting mirror and the pivoting means serving to pivot the reflecting mirror about the pivot section. Therefore, it is effective to make the thickness of the opening edge of the reflecting mirror larger than that of the other portion of the reflecting mirror in order to prevent the deformation of the reflecting mirror.

It will be apparent to those skilled in the art that various modifications and variations can be made in the reflecting mirror of the present invention and an automotive lamp using such a reflecting mirror without departing from the spirit or scope of the invention. Thus, it is intended that the present invention cover the modifications and variations of this invention provided they come within the scope of the appended claims and their equivalents.

What is claimed is:

1. A reflecting mirror for an automotive lamp comprising:
   an opening edge defining an opening; and
   a first portion having a recessed surface, wherein a thickness of the opening edge is greater along the entire periphery of the opening than a thickness of the first portion, and wherein a difference between a thickness of the opening edge and a thickness of the first portion is between 0.5 mm and 3.0 mm, the thickness of the first portion being substantially between 2.0 mm and 3.0 mm.

2. The reflecting mirror for an automotive lamp according to claim 1, wherein a thickness of the opening edge is substantially uniform.

3. The reflecting mirror for an automotive lamp according to claim 1, wherein a cross sectional area of the opening edge is arrow-shaped.

4. The reflecting mirror for an automotive lamp according to claim 1, wherein the recessed surface includes a reflecting surface.

5. The reflecting mirror for an automotive lamp according to claim 1, wherein the first portion is adjacent to the opening edge.

6. The reflecting mirror for an automotive lamp according to claim 1, wherein the first portion includes substantially an entire reflecting area of the reflecting mirror.

7. The reflecting mirror for an automotive lamp according to claim 1, wherein a length of the opening edge in an axial direction is between 1.5 mm and 10.0 mm.

8. An automotive lamp comprising:
   a reflecting mirror including:
      an opening edge defining an opening, and
      a first portion having a recessed surface, wherein a thickness of the opening edge is greater along the entire periphery of the opening than a thickness of the first portion and wherein a difference between a thickness of the opening edge and a thickness of the first portion is between 0.5 mm and 3.0 mm, the thickness of the first portion being substantially between 2.0 mm and 3.0 mm;
   a pivot section coupled to the reflecting mirror for adjusting a position of the reflecting mirror in at least one of a vertical and horizontal direction; and
   moving means for moving the reflecting mirror in an axial direction.

9. The automotive lamp according to claim 8, wherein the pivot section includes a pivot and wherein the moving means includes an acting point in the axial direction.

10. The automotive lamp according to claim 8, wherein a cross sectional area of the opening edge is arrow-shaped.

11. The automotive lamp according to claim 8, wherein the recessed surface includes a reflecting surface.

12. The automotive lamp according to claim 8, wherein the first portion is adjacent to the opening edge.

13. The automotive lamp according to claim 8, wherein the first portion includes substantially an entire reflecting area of the reflecting mirror.

14. The automotive lamp according to claim 8, wherein a thickness of the opening edge is substantially uniform.

15. The automotive lamp according to claim 8, wherein a length of the opening edge in an axial direction is between 1.5 mm and 10.0 mm.

16. An automotive lamp comprising:
   a lamp body;
   a lens; and
   a reflecting mirror disposed between the lamp body and the lens, the reflecting mirror including:
      an opening edge defining an opening, and
      a first portion having a recessed surface, wherein a thickness of the opening edge is greater along the entire periphery of the opening than a thickness of the first portion and wherein a difference between a thickness of the opening edge and a thickness of the first portion is between 0.5 mm and 3.0 mm, the thickness of the first portion being substantially between 2.0 mm and 3.0 mm.

17. The automotive lamp according to claim 16, wherein a cross sectional area of the opening edge is arrow-shaped.

18. The automotive lamp according to claim 16, wherein the recessed surface includes a reflecting surface.

19. The automotive lamp according to claim 16, wherein the first portion is adjacent to the opening edge.

20. The automotive lamp according to claim 16, wherein the first portion includes substantially an entire reflecting area of the reflecting mirror.

21. The automotive lamp according to claim 16, wherein a thickness of the opening edge is substantially uniform.

22. The automotive lamp according to claim 16, wherein a length of the opening edge in an axial direction is between 1.5 mm and 10.0 mm.

* * * * *